United States Patent [19]
Wada et al.

[11] Patent Number: 4,978,641
[45] Date of Patent: Dec. 18, 1990

[54] POROUS GLASS AND PROCESS FOR ITS PRODUCTION

[75] Inventors: Keisuke Wada, Yokohama; Yasushi Tsurita, Tokyo, both of Japan

[73] Assignee: Mitsubishi Kasei Corporation, Tokyo, Japan

[21] Appl. No.: 393,772

[22] Filed: Aug. 15, 1989

[30] Foreign Application Priority Data

Aug. 17, 1988 [JP] Japan ................................. 63-204460

[51] Int. Cl.$^5$ ...................... C03C 11/00; C03C 10/10
[52] U.S. Cl. ...................................... 501/39; 501/55; 501/54
[58] Field of Search ............................ 501/39, 55, 54

[56] References Cited

U.S. PATENT DOCUMENTS

| | | | |
|---|---|---|---|
| 3,972,721 | 8/1976 | Hammel et al. | 501/39 |
| 4,778,777 | 10/1988 | Eguchi et al. | 501/39 |

FOREIGN PATENT DOCUMENTS

1017443 1/1986 Japan ..................................... 501/39

*Primary Examiner*—William R. Dixon, Jr.
*Assistant Examiner*—Susan Hollenbeck
*Attorney, Agent, or Firm*—Oblon, Spivak, McClelland, Maier & Neustadt

[57] ABSTRACT

Porous glass consisting essentially of silica, zicronia and an alkali metal compound, wherein the content of zirconia is at least 5% by weight and the content of the alkali metal compound is at least 2% by weight as calculated as $M_2O$ wherein M is an alkali metal element, and the total pore volume (A) of pores having pore radii of from 20 to 10,000 Å is at least 0.2 ml/g. and the proportion of the pore volume (B) of pores having pore radii of from 100 to 10,000 Å to the total pore volume (A) of pores having pore radii of from 20 to 10,000 Å is at least 80%.

5 Claims, 8 Drawing Sheets

POROUS GLASS AND PROCESS FOR ITS PRODUCTION

BACKGROUND OF THE INVENTION

1. Field of the Invention

The present invention relates to porous glass and a process for its production.

2. Discussion of Background

Porous glass has an excellent separating ability since pores thereof are very much uniformly distributed. Therefore, it is expected as a prospective material for use as a separating filter material in the chemical industry or in the medical field, such as for gas separation, reverse osmosis, ultrafiltration or blood purification, as a carrier for enzymes and catalysts, or as a filler for chromatography. However, the skeleton of conventional porous glass is composed essentially of $SiO_2$, and when used in an aqueous solution, it gradually dissolves, whereby the pore size increases. Further in an alkaline solution, it dissolves in a short period of time. Thus, it had a serious drawback in the durability.

It is known to add a substantial amount of an alkaline earth metal oxide to the matrix glass composition to produce porous glass having excellent alkaline resistance i.e. $SiO_2$—$ZrO_2$ porous glass (Japanese Unexamined patent Publication No. 202839/1987, and Prepararatory papers for the annual lecture meeting of Yogyo Kyokai for 1986, p.493–494).

However, it is known that by this method, the amount of zirconia introduced into the glass skeleton is small relative to the amount of zirconia used. Further, the $SiO_2$—$ZrO_2$ porous glass obtained by this method has a difficulty such that zirconia is present not in the glass skeleton but in pores of the glass skeleton in a substantial amount in the form of a zirconia gel, and it is difficult to obtain a porous glass unless treatment is applied to elute the zirconia gel by a strong acid.

Further, a method for producing $SiO_2$–$ZrO_2$ porous glass by a sol-gel method is known (Japanese Unexamined patent Publication No. 17443/1986). However, the pore size of glass obtained by this method is as small as 40 Å at the maximum.

It is also known to produce silicic acid having a large pore structure by impregnating an inorganic salt to silica gel, followed by calcining treatment (Japanese Unexamined patent Publication No. 5817/1972). However, this method teaches nothing about $SiO_2$-$ZrO_2$ porous glass.

As glass fibers (non-porous) for reinforcing cement having excellent alkaline resistance, $R_2O$—$ZrO_2$—$SiO_2$ glass wherein R is a metal element, Cem Fil ("Dictionary for Glass", compiled by Sumio Sakka, Asakura Shoten), is known.

SUMMARY OF THE INVENTION

It is an object of the present invention to provide porous glass having excellent alkaline resistance by virtue of zirconia contained in an adequate amount in the glass composition and having pores having pore sizes of at least 100 Å, and a process for its production.

The present invention provides porous glass consisting essentially of silica, zirconia and an alkali metal compound, wherein the content of zirconia is at least 5% by weight and the content of the alkali metal compound is at least 2% by weight as calculated as $M_2O$ wherein M is an alkali metal element, and the total pore volume (A) of pores having pore radii of from 20 to 10,000 Å is at least 0.2 ml/g, and the proportion of the pore volume (B) of pores having pore radii of from 100 to 10,000 Å to the said total pore volume (A) is at least 80%.

The $SiO_2$—$ZrO_2$—$M_2O$ porous glass of the present invention can be prepared by a process for producing porous glass consisting essentially of silica, zirconia and an alkali metal compound, which comprises adding an alkali metal compound to a porous gel consisting essentially of silica and zirconia, heat-treating the resulting mixture within a temperature range of from 500° to 1,000° C., and then eluting a component soluble in an aqueous solution; or a process for producing porous glass consisting essentially of silica, zirconia and an alkali metal compound, which comprises adding a zirconium compound and an alkali metal compound to a porous silica gel, heat-treating the resulting mixture within a temperature range of from 500° to 1,000° C., and then eluting a component soluble in an aqueous solution

DETAILED DESCRIPTION OF THE PREFERRED EMBODIMENTS

Now, the process for producing porous glass of the present invention will be described.

The present inventors have engaged in the research for the process for producing porous materials of inorganic oxides for many years and have made the following inventions and have made patent applications therefor:

(a) a process for producing a spherical silica porous body, which comprises dropwise adding into water a solution obtained by dissolving a partially condensed product of an silicon alkoxide in an organic solvent, to form a gelled product of fine particles and then calcining this gelled product (a patent application filed on July 11, 1988);

(b) a process for producing an inorganic porous body, which comprises adding fine particles of carbon material to a solution containing a partially condensed product of a silicon alkoxide or to a solution containing a partially condensed product of a silicon alkoxide and a metal compound of zirconium, titanium or aluminum, contacting the resulting mixture with water to form a gelled product, and calcining this gelled product in a high temperature oxidizing atmosphere (a patent application filed on July 11, 1988); and (c) a spherical silica porous body and a process for its preparation, which comprises adding fine silica having a particle size of from 0.01 to 10 μm to a non-aqueous solution containing a partially condensed product of a silicon alkoxide and adding it into water to obtain a gel, and then separating the gelled product obtained from this solution (a patent application filed on July 11, 1988).

As a process for producing a porous gel consisting essentially of silica and zirconia to be used in the present invention, the above-mentioned inventions or their modifications for a process for producing a porous gel, may be employed.

For example, in the case where a porous gel consisting essentially of silica and zirconia is to be employed, a zirconium alkoxide is first added to a partially condensed product of an alkyl silicate, followed by heating to obtain a precursor, and a solution having this precursor dissolved, is dropwise added to water to obtain a porous gel.

Other than the one described above, as the porous gel consisting essentially of silica and zirconia useful for the present invention, a silica-zirconia coprecipitated gel may, for example, be mentioned which is obtained from a zirconia source such as zirconium oxychloride or zirconium chloride and a silica source such as a silicon alkoxide, silicon tetrachloride or sodium silicate (Dokl, Akad, Nauk Ukr SSR, Ser. B, No. 8, 58-60 (1984)).

In the case where a porous silica gel is employed, the following silica gels may be employed (1) Silica gel obtained by a sol-gel method by using an alkyl silicate as the starting material;

(2) Silica gel obtained by mixing an aqueous sodium silicate solution with an acid;

(3) Silica gel obtained by gelling colloidal silica; or (4) Silica gel precipitated from a gas phase using $SiCl_4$ or $Si(OR)_4$ as the starting material, or silica gel obtained by gelling fumed silica obtained by this method, with an aqueous solution.

The porous gel composed essentially of silica and zirconia, or the porous silica gel to be used in the present invention may be in the form of a dry gel containing adsorbed moisture or in the form of a calcined product obtained by calcining such a dry gel. When the dry gel is produced by e.g. a sol-gel method, an organic solvent such as an alcohol may sometimes be contained in the gel, or an alkoxide group derived from an alkoxide may sometimes be contained in the gel. Such a gel may be used as it is.

The form of the gel may be of any shape such as a monolithic shape or a fine spherical shape.

The pore volume of the porous gel is preferably at least 0.5 ml/g. If the pore volume is smaller than 0.5 ml/g, the pore volume of the porous glass product tends to be extremely small. In this invention, the pore volume of the porous gel is the total pore volume of pores having pore radii of from 20 to 75,000 Å of the product, which was obtained by drying the porous gel at 100° C., and then gradually heating to 700° C. at a heating rate of 2° C./min and calcinning for 5 hours in air.

The porous gel consisting essentially of silica and zirconia to be used in the present invention may have a composition wherein the content of zirconia is from 2 to 70% by weight, preferably from 5 to 50% by weight, as the gel is calculated as oxides.

Further, the porous gel consisting essentially of silica and zirconia, or the porous silica gel to be used in the present invention, may further contain other metal oxides such as boron oxide or alumina in an amount of up to 10% by weight as the gel is calculated as oxides.

In the present invention, an alkali metal compound, or an alkali metal compound and a zirconium compound, are added to such a porous gel, and the resulting mixture is subjected to heat treatment. The alkali metal compound to be reacted with the gel consisting essentially of silica and zirconia, may be an inorganic salt, a hydroxide or an organic compound of an alkali metal. As the inorganic salt of the alkali metal, a halide such as LiCl, NaCl or KCl, a carbonate such as $Na_2CO_3$ or $K_2CO_3$, a nitrate or a sulfate may be mentioned. Likewise, as the organic compound of an alkali metal, a carboxylate such as an acetate or an alkoxide may be mentioned.

The alkali metal compound is used usually in an amount of from 0.01 to 10 g, preferably from 0.05 to 5 g, per g of the gel consisting essentially of silica and zirconia. Even if the amount is more than the above range, no further improvement in the operation of the reaction will be obtained. On the other hand, if the amount is less than the above range, no adequate effect will be obtained, or only a part of the gel will be transformed into porous glass.

The zirconium compound to be reacted with the porous silica gel may be an inorganic salt, a hydroxide or an organic compound of zirconium. As the inorganic salt of zirconium, an oxysalt such as $ZrOCl_2$, $ZrO(NO_3)_2$ or $(NH_4)_2ZrO(CO_3)_2$, a halide such as $ZrCl_4$ or $ZrBr_4$, zirconium sulfate, $M_4Zr(C_2O_4)_4$ wherein M is an alkali metal or an ammonium ion, or zirconia such as zirconium oxide sol, may be mentioned. As the organic compound of zirconium, a zirconium alkoxide or zirconium oxyacetate may be mentioned.

The zirconium compound is used in such an amount that it is equivalent to the amount of zirconia contained in the above-mentioned porous gel consisting essentially of silica and zirconia.

As the alkali metal compound, the same compound as used for the above porous gel consisting essentially of silica and zirconia may be employed in an amount within the same range as described above Then, such a gel is mixed with an alkali metal compound or with a zirconium compound and an alkali metal compound. Such mixing should better be as uniform as possible. For example, the alkali metal salt, or the zirconium compound and the alkali metal salt are made into an aqueous solution, which is then impregnated to the starting material gel.

In the case of the porous silica gel, firstly the zirconium compound may be mixed and dried, and then an alkali metal compound may be mixed thereto.

The mixture of the starting material gel with the alkali metal compound or with the zirconium compound and the alkali metal compound, thus obtained, may be dried and subjected to heat treatment, as the case requires.

The heating temperature and time vary depending upon the proportions of the starting materials gel and the alkali metal compound, the type of the alkali metal compound or the desired product. However, the heat treatment is usually conducted at a temperature of from 500° to 1,000° C. for a heating time of from 1 to 24 hours. If the heating temperature is low, or the heat time is short, the growth of fine particles of glass tends to be inadequate. On the other hand, if the heat temperature is too high, or the heating time is too long, the product will be glass having no substantial porosity.

As the heating atmosphere, the treatment may be conducted in the presence of air or in an inert gas atmosphere.

In this heat treatment step, the alkali metal compound will react with the gel consisting essentially of silica and zirconia, or the zirconium compound and the alkali metal compound will react with the porous silica gel, to form fine particles of glass consisting essentially of silica, zirconia and the alkali metal compound.

After the heat treatment, the product is washed prefearbly with water in order to remove an excess amount of the alkali metal compound, a reaction byproduct derived therefrom or a compound containing e.g. silica formed from the starting material gel. Then, the product is dried by a usual method at a temperature of about 100° C. When the adsorbed water is required to be removed from the porous glass product, the product is heated at a temperature of at least 200° C. or calcined at a temperature of not higher than 800° C. The porous glass of the present invention consists essentially of silica, zirconia and the alkali metal compound, wherein the content of zirconia is from 5 to 50% by weight, preferably from 10 to 30% by weight, and the content of the alkali metal compound is from 2 to 20% by weight, preferably from 2 to 15% by weight, as calculated as $M_2O$ where M is an alkali metal element.

The porous glass of the present invention may contain up to 10% by weight of other metal oxides As such metal oxides, for example, titania, alumina, boron oxide and rare earth oxides may be mentioned. It is preferred that such metal oxides are preliminarily added to the starting material gel, since they can thereby be uniformly mixed The porous glass of the present invention thus obtained has pores having pore sizes within a range of 20 to 75,000 Å, as the pore size distribution is measured by a mercury injection method.

The total pore volume of pores having pore radii of from 20 to 10,000 Å of the porous glass of the present invention is at least 0.2 ml/g, and preferably at least 0.5 ml/g. The porous glass of the present invention is characterized particularly in that the pore size is substantially uniform. Namely, the proportion of the total pore volume (B) of pores having pore radii of from 100 to 10,000 Å to the total pore volume (A) of pores having pore radii from 20 to 10,000 Å is at least 80%, and preferably at least 90%.

The proportion of the total pore volume (C) of pores having pore radii of from 100 to 5,000 Å to the total volume (A) is at least 60%, and preferably at least 65%. Namely, the pore volume of pores having pore radii of from 100 to 5,000 Å of the porous glass of the present invention is extremely big.

When the shape of the porous glass of the present invention is observed by a scanning electron microscope, it is ascertained that glassy fine particles have substantially uniform diameters and they are connected to one another in a mutually fused fashion. This shape resembles that of porous glass obtained by the conventional phase separation method, but a gel which is observed among glass skeletons of the porous glass obtained in the conventional phase separation method, is not observed in the present invention.

Now, the present invention will be described in further detail with reference to Examples. However, it should be understood that the present invention is by no means restricted to such specific Examples In the Examples, the pore distribution and the pore volume were measured by a mercury injection type porosimeter (Autopore 9200, manufactured by Micrometrix). The measurable range of pores was at least 20 Å in radius. The specific surface area was measured by a nitrogen adsorption method and calculated by a BET method. The device used for the measurement was Sorptmatic 1800 manufactured by Carloelba Co.

EXAMPLE 1

Preparation of starting material gel

To 250 g of tetraethyl orthosilicate (manufactured by Tokyo Kasei), a solution comprising 68.2 g of ethanol, 6.5 g of water and 9.35 g of a 0.1N HCl ethanol solution, was added, and the mixture was heated at 60° C. for 30 minutes to obtain a partially condensed product of tetraethyl orthosilicate (molar ratio of $H_2O/Si(OEt)_4$: 0.3). To this condensation product, 31.9 g of zirconium n-butoxide and 31.8 g of tri-n-butyl phosphorous acid ester were added to obtain a uniform solution, which is then heated at 120° C. for 1 hour and then to 150° C. to distill off volatile liquid, to obtain a precursor solution (276.0 g).

To 45 ml of this precursor, 22.5 ml of t-amyl alcohol and 7.5 ml of cyclohexane were added to obtain a uniform solution. This solution was dropwise added to an aqueous solution comprising 433.9 g of water, 13.5 g of ethanol and 3.4 g of Tween 20 (polyoxyethylene sorbitan monolaurate) to form liquid drops. Then, while continuing the stirring, an ammonia solution comprising 36 ml of 28% aqueous ammonia and 22.5 ml of water, was gradually added for gellation. The stirring was continued for further 5 hours and then the mixture was left to stand overnight to let the product precipitate. The supernatant was removed by decantation, and then ethanol was added to the rest, and the mixture was stirred for 30 minutes, followed by decantation and washing. Then, the precipitates were separated from the solution by filtration and dried at 100° C. for 5 hours in a dryer. This dried gel was fine spherical particles having a particle diameter of from about 10 to 100 μm. This gel was calcined at 700° C. for 5 hours, and the product had a composition of 83% $SiO_2$-17% $ZrO_2$, a total pore volume of 5.71 cc/g and a broad pore size distribution within a range of about from 100 to 20,000 Å, and the pore volume of pores having pore radii of from 20 to 10,000 Å was 3.88 cc/g. (With respect to the dried gel, the measurement by a mercury injection method is difficult since the particle strength is low. Therefore, the results of the measurements of the calcined product are shown. The bulk density of the dried gel is smaller than the above calcined product, and the porosity of the dried gel is assumed to be apparently higher than that of the calcined product.)

Preparation of porous glass

Figure 1:
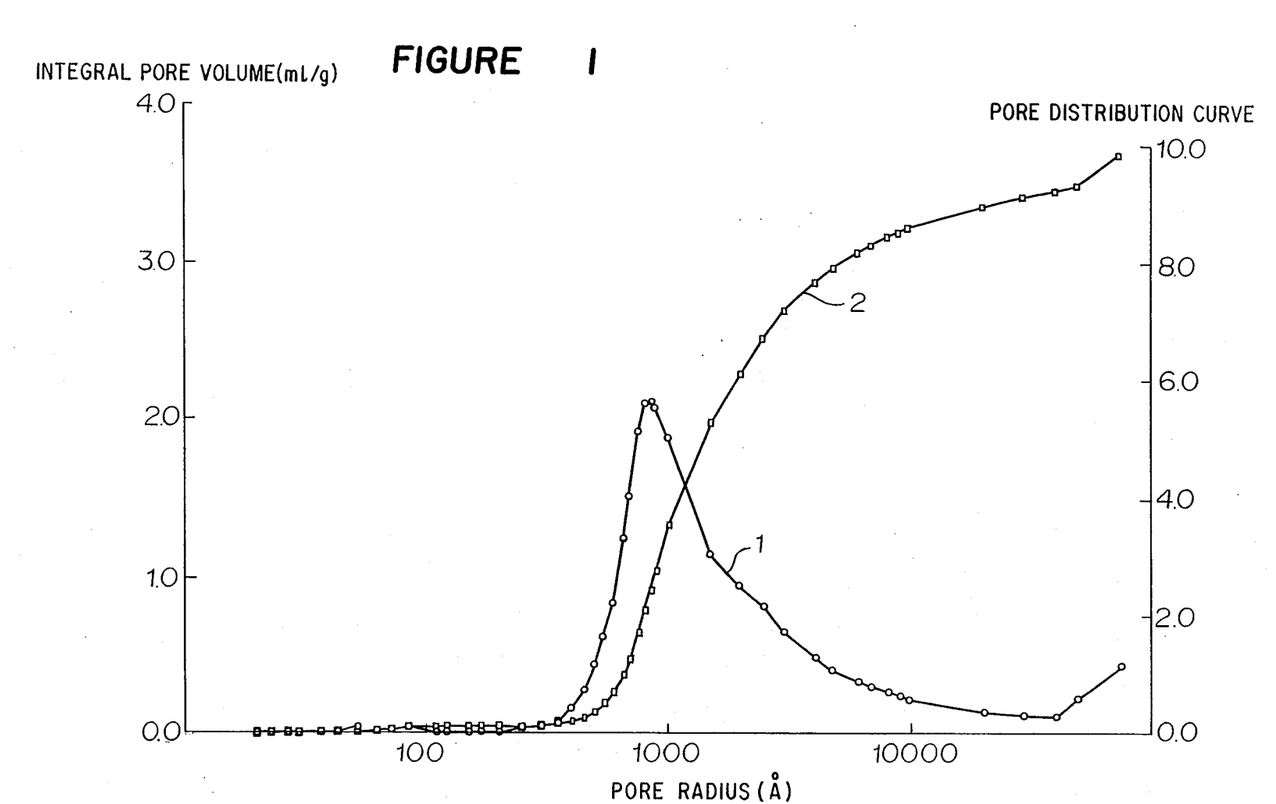
FIGS. 1 to 4 are graphs showing the pore distributions and integral pore volumes relative to the pore radii, wherein reference numerals 1, 3, 5 and 7 indicate pore distribution curves, and reference numerals 2, 4, 6 and 8 indicate integral pore volume curves.

To 2.0 g of the dried gel obtained in the above step, 6.13 g of an aqueous solution containing 15% by weight of sodium chloride to have the aqueous solution adsorbed on the gel. Then, the gel was dried at 110° C. for 5 hours, and then gradually heated to 730° C. at a rate of 2° C./min and calcined for 5 hours in air. The sample thereby obtained was put into 250 ml of water and left to stand for 3 hours under stirring The supernatant was removed by decantation, and 250 ml of water was again added. The mixture was heated at 90° C. for 3 hours and then left to stand. The supernatant was removed by decantation, and 1 l of water was added. The mixture was stirred and then subjected to filtration to recover the product, which was dried at 110° C. for 5 hours (yield: 1.13 g). This product is assumed to be found to have the following composition; $SiO_2$: 77.3 wt %, $ZrO_2$: 16.4 wt %, $Na_2O$: 6.3 wt %. The physical properties of the product thus obtained are shown in Table 1, and the pore distribution curve is shown in FIG. 1.

EXAMPLE 2

Porous glass of the present invention was prepared in the same manner as in Example 1 except that the mixture comprising the dried gel and sodium chloride was calcined at 760° C. for 5 hours.

Figure 5:
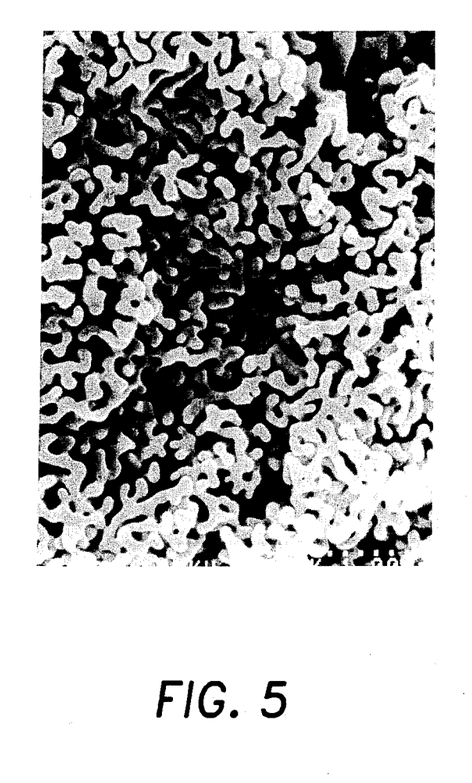
FIGS. 5 to 8 are electron microscopic photographs showing particle structures of the porous glass of the present invention.

This product is assumed to be found to have the following composition; $SiO_2$: 76.7 wt %, $ZrO_2$: 16.3 wt %, $Na_2O$: 7.0 wt %. The physical properties of this sample are shown in Table 1, and the electron microscopic photograph is shown in FIG. 5.

EXAMPLE 3

Figure 6:
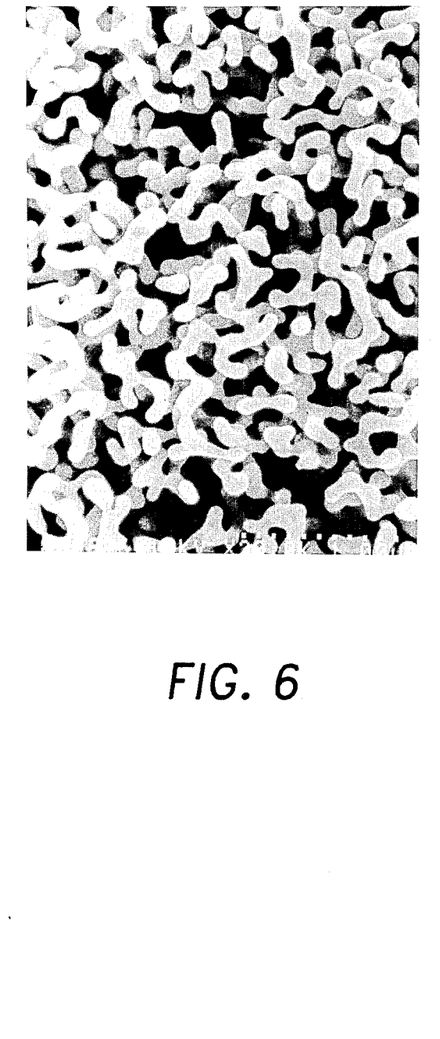

Porous glass of the present invention was prepared in the same manner as in Example 1 except that the mixture comprising the dried gel and sodium chloride was calcined at 800° C. for 5 hours. The physical properties of the product are shown in Table 1, and the electron microscopic photograph is shown in FIG. 6. This product was found to have the following composition from the results of the chemical analysis $SiO_2$: 75.3 wt %, $ZrO_2$: 16.0 wt %, $Na_2O$: 7.9 wt %, and Cl: 0.1 wt %. From this Example, it is apparent that the product contains Na, and Cl does not substantially remain. When the product was measured by X-ray diffractometer, any peak of crystals was not detected.

EXAMPLE 4

Figure 2:
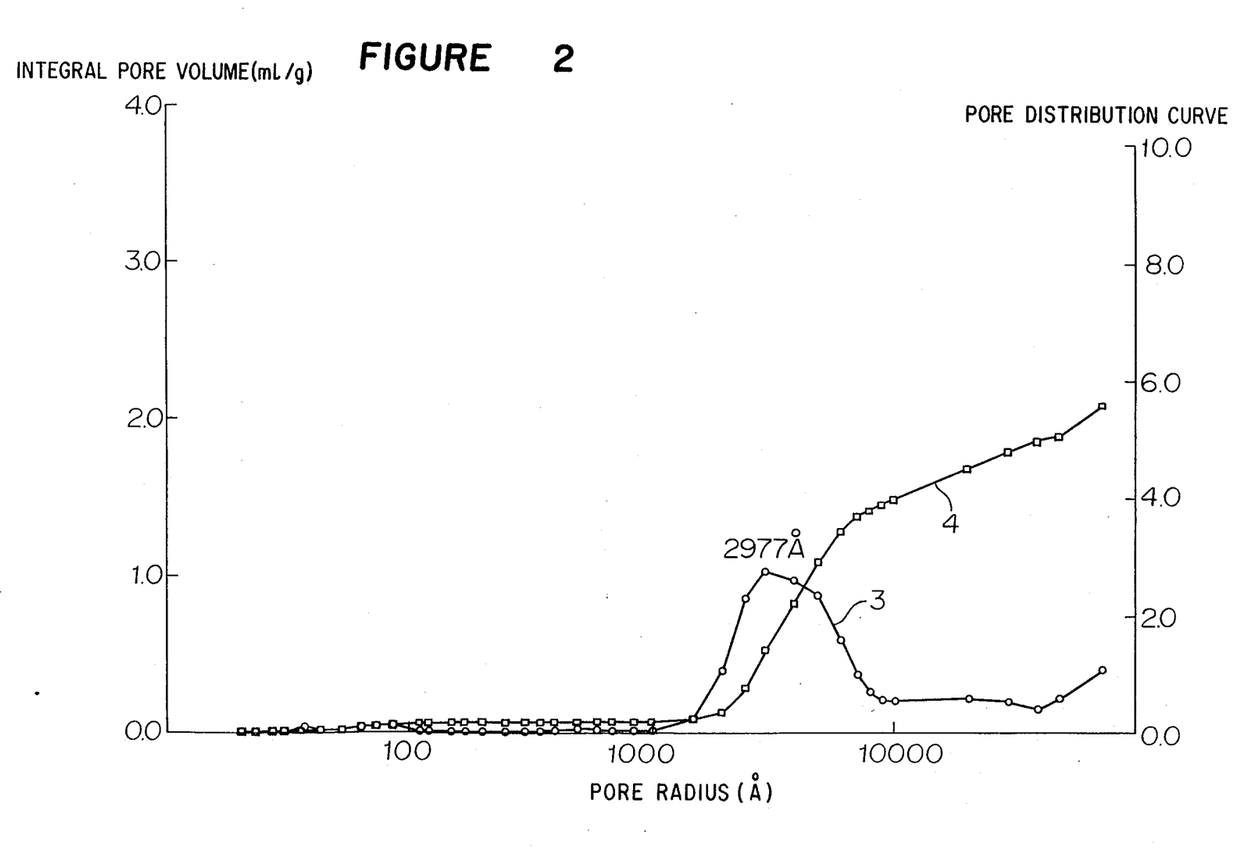

Porous glass of the present invention was prepared in the same manner as in Example 1 except that 1.93 g of an aqueous solution containing 15% by weight of sodium chloride was used relative to 1.0 g of the dried gel, and the calcination was conducted at 800° C. for 5 hours. The physical properties of the product are shown in Table 1, and the pore distribution curve is shown in FIG. 2. This product had a composition of $SiO_2$: 75.9 wt %, $ZrO_2$: 16.3 wt %, $Na_2O$: 8.8 wt %, and Cl: 0.1 wt %.

EXAMPLE 5

The dried gel as described in Example 1 was calcined at 700° C. for 5 hours, and then 1.93 g of an aqueous solution containing 15% by weight of sodium chloride was absorbed relative to 1.0 g of the dried gel. Then, the gel was dried at 110° C. for 5 hours, and then gradually heated to 800° C. at a rate of 2° C./min and calcined for 5 hours in air. Then the preparation of porous glass was conducted in the same manner as in Example 1. The product was found to have the following composition; $SiO_2$: 72.5 wt %, $ZrO_2$: 15.0 wt %, $Na_2O$: 8.9 wt %.

The physical properties of this sample are shown in Table 1.

EXAMPLE 6

Porous glass of the present invention was prepared in the same manner as in Example 1 except that 3.92 g of an aqueous solution containing 15% by weight of potassium chloride was used relative to 1.0 g of the dried gel, and the calcination was conducted at 800° C. for 5 hours.

The physical properties of the product are shown in Table 1. This product is assumed to be found to have the following composition; $SiO_2$: 71.4 wt %, $ZrO_2$: 15.3 wt %, $K_2O$: 13.4 wt %.

From the electron microscopic photograph, it was observed that substantially uniform glass particles were connected to one another.

EXAMPLE 7

To 250 g of tetraethyl orthosilicate (manufactured by Tokyo Kasei), a solution comprising 68.2 g of ethanol, 6.5 g of water and 9.35 g of a 0.1N HCl ethanol solution, was added, and the mixture was heated at 60° C. for 30 minutes to obtain a partially condensed product of tetraethyl orthosilicate (molar ratio of $H_2O/Si(OEt)_4$: 0.3).

To this condensation product, 36.5 g of zirconium n-butoxide was added to obtain a uniform solution, which is then heated at 120° C. for 1 hour and then to 150° C. to distill off volatile liquid, to obtain a precursor solution (242.6 g).

To 45 ml of this precursor, 22.5 ml of t-amyl alcohol and 7.5 ml of cyclohexane were added to obtain a uniform solution. This solution was dropwise added to an aqueous solution comprising 433.9 g of water, 13.5 g of ethanol and 3.4 g of Tween 20 (polyoxyethylene sorbitan monolaurate) to form liquid drops. Then, while continuing the stirring, an ammonia solution comprising 36 ml of 28% aqueous ammonia and 22.5 ml of water, was gradually added for gellation. The stirring was continued for further 5 hours and then the mixture was left to stand overnight to let the product precipitate. The supernatant was removed by decantation, and then ethanol was added to the rest, and the mixture was stirred for 30 minutes, followed by decantation and washing. Then, the precipitates were separated from the solution by filtration and dried at 110° C. for 3 hours in a dryer.

Porous glass of the present invention was prepared in the same manner as in Example 1 except that 1.93 g of an aqueous solution containing 15% by weight of sodium chloride was used relative to 1.0 g of the dried gel obtained in the above step, and the calcination was conducted at 800° C. for 5 hours. This product is assumed to be found to have the following composition; $SiO_2$: 71.3 wt %, $ZrO_2$: 20.1 wt %, $Na_2O$: 8.6 wt %.

The physical properties of this product are shown in Table 1.

EXAMPLE 8

To 250 g of tetraethyl orthosilicate (manufactured by Tokyo Kasei), a solution comprising 68.2 g of ethanol, 5.4 g of water and 12.0 g of a 0.1N HCl ethanol solution, was added, and the mixture was heated at 60° C. for 30 minutes to obtain a partially condensed product of tetraethyl orthosilicate (molar ratio of $H_2O/Si(OEt)_4$: 0.25). To this condensation product, 47.0 g of zirconium n-butoxide, 10 g of ethanol and 10 g of isopropanol were added to obtain a uniform solution, which is then heated at 120° C. for 1 hour and then to 150° C. to distill off volatile liquid, to obtain a precursor solution (257.5 g). To 37.5 ml of this precursor, 28.2 ml of t-amyl alcohol and 9.4 ml of cyclohexane were added to obtain a uniform solution, and then 5.0 g of carbon black (particle size 700 Å, DBP absorption value 125 ml/100 g, surface area: 20 m²/g) was added to the solution and mixed.

This solution was dropwise added to an aqueous solution comprising 531 g of water, 60 g of ethanol and 9.0 g of Tween 20 (polyoxyethylene sorbitan monolaurate) to form liquid drops. Then, while continuing the stirring, an ammonia solution comprising 45 ml of 28% aqueous ammonia and 105 ml of water, was gradually added for gellation. The mixture was left to stand overnight to let the product precipitate. The supernatant was removed by decantation, and then ethanol was added to the rest, and the mixture was stirred for 30 minutes, followed by decantation and washing. Then, the precipitates were separated from the solution by filtration and dried by evaporator. Then, the dried gel was further dried at 250° C., and then heated gradually to 600° C. at a rate of 1° C./min and calcined for 3 hours in air.

Porous glass of the present invention was prepared in the same manner as in Example 1 except that 5.80 g of an aqueous solution containing % by weight of sodium chloride was used relative to 1.0 g of the gel obtained in the above step, and the calcination was conducted at 800° C. for 5 hours.

The physical properties of this product are shown in Table 1. This product is assumed to be found to have the following composition; $SiO_2$: 70.7 wt %, $ZrO_2$: 22.3 wt %, $Na_2O$: 7.0 wt %.

COMPARATIVE EXAMPLE 1

To 500 g of tetraethyl orthosilicate (manufactured by Tokyo Kasei), a solution comprising 136.3 g of ethanol, 43.24 g of water and 18.7 g of a 0.1N HCl ethanol solution was added, and the mixture was heated at 60° C. for 30 minutes to obtain a partially condensed product of tetraethyl orthosilicate (molar ratio of $H_2O/Si(OEt)_4$: 1.0, molar ratio of $HCl/Si(OEt)_4$: 0.001). Then, under an argon stream atmosphere, the product was heated initially at 120° C. for 2 hours and then at 150° C. to distill off volatile liquid to obtain a precursor solution (337.5 g).

To 45 ml of a solution containing the partially condensed product of the silicon alkoxide thereby obtained, 22.5 ml of t-amyl alcohol and 7.5 ml of cyclohexane were added to obtain a uniform solution This solution was dropwise added to an aqueous solution comprising 433.9 g of water, 13.5 g of ethanol and 3.4 g of Tween 20 (polyoxyethylene sorbitan monolaurate) to form liquid drops. Then, while continuing the stirring at 400 rpm, an ammonia solution comprising 36 ml of 28% aqueous ammonia and 22.5 ml of water was gradually added for gellation. The stirring was continued for further 5 hours, and then the mixture was left to stand still to let the product precipitate The supernatant was removed by decantation, and ethanol was added to the rest. The mixture was stirred for 30 minutes, followed by decantation and washing. Further, the precipitates were separated from the solution by filtration and dried at 100° C. for 8 hours in a dryer. This dried product was gradually heated to 600° C. at a rate of 2° C./min and held for 3 hours for calcination under an air stream. The product had a composition of almost 100% $SiO_2$.

COMPARATIVE EXAMPLE 2

To 54.3 g of tetraethyl orthosilicate, a solution comprising 14.8 g of ethanol, 4.7 g of water and 2.02 g of a 0.1N HCl ethanol solution, was added, and the mixture was heated at 60° C. for 30 minutes to obtain a partially condensed product of tetraethyl orthosilicate To this partially condensed product, 99.0 g of zirconium n-butoxide, 10 g of ethanol and 10 g of isopropanol were added to obtain a uniform solution. Then, the mixture was heated initially at 120° C for 1 hour and then at 150° C. to distill off volatile liquid and to obtain a precursor. To 37.5 ml of this precursor, 9.4 ml of cyclohexane was added, and the mixture was mixed for 30 minutes.

This mixture was dropwise added to an aqueous solution comprising 531 g of water, 60 g of ethanol and 9.0 g of Tween 20, to form liquid drops. While continuing the the stirring, an aqueous ammonia solution comprising 45 ml of 28% aqueous ammonia and 105 ml of water, was gradually added for gellation. The mixture was left to stand still overnight, and then precipitated fine particles were separated by decantation, and ethanol was added thereto The mixture was stirred and again left to stand still. The supernatant was removed by decantation, and the rest was dried by evaporator. The sample thus obtained was dried at 250° C. and further gradually heated to 600° C. at a rate of 1° C./min and calcined for 3 hours. This calcined product was found by the chemical analysis to have a composition comprising 28.6% by weight of $SiO_2$ and 70.4% by weight of $ZrO_2$.

COMPARATIVE EXAMPLE 3

Porous glass was prepared by a separation phase method with reference to the compositions of "Silas" porous glass and basic glass as disclosed in the November, 1987 issue of Kino Zairyo (Functional Materials), p. 27.

Namely, 16.59 g of $SiO_2$, 3.16 g of $Al_2O_3$, 5.42 g of $B_2O_3$, 10.19 g of $CaCO_3$, 2.83 g of $Na_2CO_3$, 1.08 g of $K_2CO_3$ and 0.063 g of MgO were mixed, then put into a platinum crucible and melted at 1,440° C. to obtain mother glass. This mother glass was pulverized, then heat-treated at 760° C. for 22 hours and sieved to obtain particles having particle sizes of from 10 to 35 mesh. 2.0 g of the particles were subjected to etching treatment of the surface in about 2% HF, then heated at 8020 C. in 600 ml of 1N HCl, then subjected to decantation and washed three times with 1 l of water. This sample had a total pore volume of 0.19 ml/g and had a peak of the pore distribution at 8,835 Å.

EXAMPLE 9

With respect to each sample of Examples 1 to 4 and Comparative Examples 1 to 3, the amount of eluted silica was quantitatively analyzed for comparison of the alkali resistance (Table 2). Namely, about 100 mg of the sample was accurately weighed, then immersed in a 0.1N sodium hydroxide aqueous solution and left to stand at room temperature for 24 hours. The supernatant was sampled and eluted silica was quantitatively analyzed. The proportion of the eluted silica to the sample used and the elution rate per surface area obtained by dividing the eluted silica by the surface area, are shown in Table 2. From Table 2, it is evident that with the samples of the present invention, the elution rate of $SiO_2$ is very small, thus indicating excellent alkaline resistance. Even when compared with the results of Comparative Example 2, where the $ZrO_2$ content is high, it is evident that not only the elution of $SiO_2$ is small but also the elution rate per surface area is small.

TABLE 1

| Example No. | Total pore volume 20Å–75,000Å | Pore volume (ml/g) [A] 20Å–10,000Å | [B] 100Å–10,000Å | [C] Å100Å–5,000Å | Proportion of pore volume Å[B]/[A] (%) | [C]/[A] (%) | Pore distribution peak radius (Å) | Surface area (m²/g) |
|---|---|---|---|---|---|---|---|---|
| 1 | 3.68 | 3.18 | 3.16 | 3.00 | 99.4 | 94.4 | 804 | 48 |
| 2 | 3.54 | 2.93 | 2.93 | 2.57 | 100 | 87.8 | 894 | 37 |
| 3 | 3.23 | 2.43 | 2.37 | 2.04 | 97.3 | 83.7 | 1,000 | 28 |
| 4 | 2.10 | 1.48 | 1.43 | 1.08 | 96.9 | 72.9 | 2,977 | 10 |
| 5 | 3.53 | 2.65 | 2.60 | 2.20 | 98.1 | 83.0 | 1,488 | 23 |
| 6 | 2.54 | 1.80 | 1.75 | 1.22 | 97.1 | 67.8 | 2.428 and 6,095 | 10 |
| 7 | 0.93 | 0.70 | 0.66 | 0.63 | 94.3 | 90.0 | 689 | 14 |
| 8 | 2.47 | 2.20 | 2.01 | 1.81 | 91.2 | 82.3 | 1,478 | 32 |

TABLE 2

| Sample | Heat treatment | SiO₂ elution (%) | Surface area (m²/g) | Elution per surface area × 100 |
|---|---|---|---|---|
| Example 1 | 0.46 g NaCl/1.0 g gel/730° C. | 0.97 | 48 | 2.0 |
| Example 2 | 0.46 g NaCl/1.0 g gel/730° C. | 0.62 | 37 | 1.7 |
| Example 3 | 0.46 g NaCl/1.0 g gel/800° C. | 0.20 | 28 | 0.7 |
| Example 4 | 0.29 g NaCl/1.0 g gel/800° C. | 0 | 10 | ≈0 |
| Comparative Example 1 | Calcined at 600° C. | 93.2 | 312 | 29.9 |
| Comparative Example 2 | Calcined at 600° C. | 3.1 | 107 | 2.9 |
| Comparative Example 3 | | 1.64 | 3 | 54.7 |

EXAMPLE 10

Figure 3:
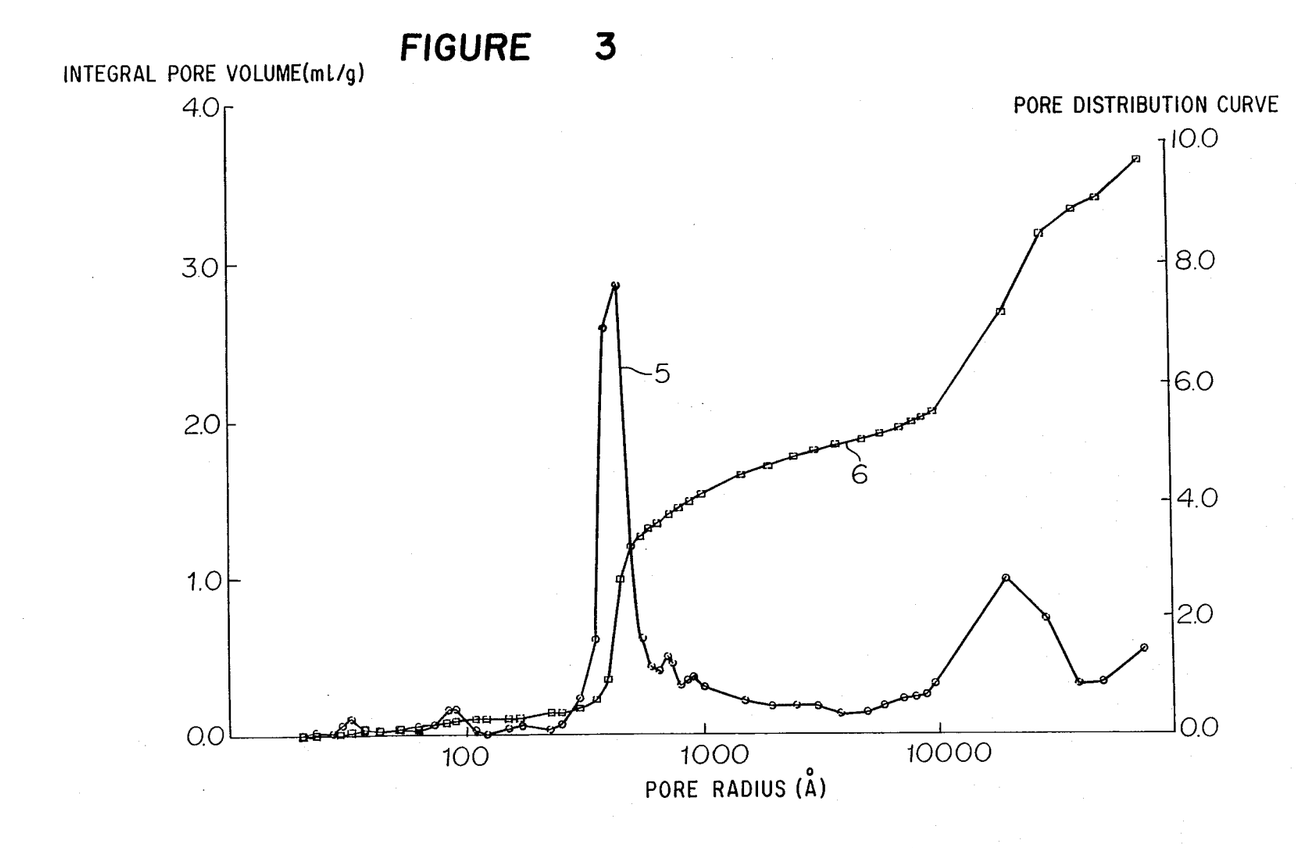
Figure 7:
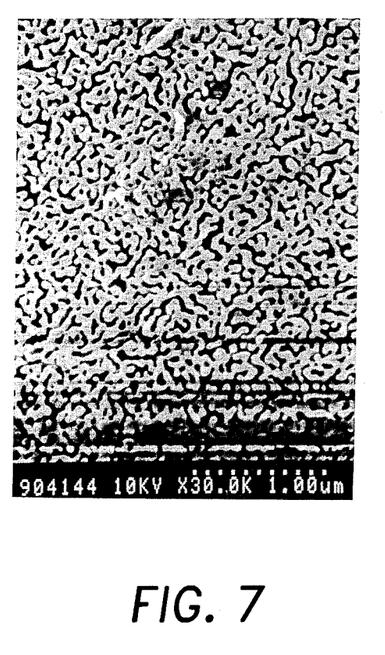

0.40 g of zirconium oxychloride octahydrate was added to 5.67 g of an aqueous solution containing 5% by weight of sodium chloride to obtain a solution This solution was added to 1.0 g of the dried gel prepared in the same manner as Comparative Example 1 except that the rate of stirring was 1,000 rpm to have it adsorbed on the gel. The gel was dried at 120° C. for 5 hours, then gradually heated to 730° C. at a rate of 2° C./min and calcined in air for 5 hours. This sample was put into 200 ml of water, stirred for 2 hours and then left to stand still. The supernatant was removed by decantation, and a similar operation was repeated, and then 200 ml of water was again added. The mixture was heated to 90° C. for 2 hours and then left to stand still The supernatant was removed by decantation, and the rest was subjected to filtration to recover the product, which was dried at 120° C. for 5 hours (yield: 0.73 g). The product had a surface area of 48 m²/g, a pore volume of pores having pore radii of from 20 to 10 000 Å of 2.09 ml/g, a pore volume of pores having pore radii of from 100 to 1,000 Å of 1.45 ml/g. The pore distribution curve is shown in FIG. 3, and the electron microscopic photograph is shown in FIG. 7.

This product was found to have a composition comprising 81.7% by weight of SiO₂, 13 0% by weight of ZrO₂ and 3.7% by weight of Na₂O. The pore distribution state was found to be B/A=95.7% and C/A=85.4%.

EXAMPLE 11

Figure 4:
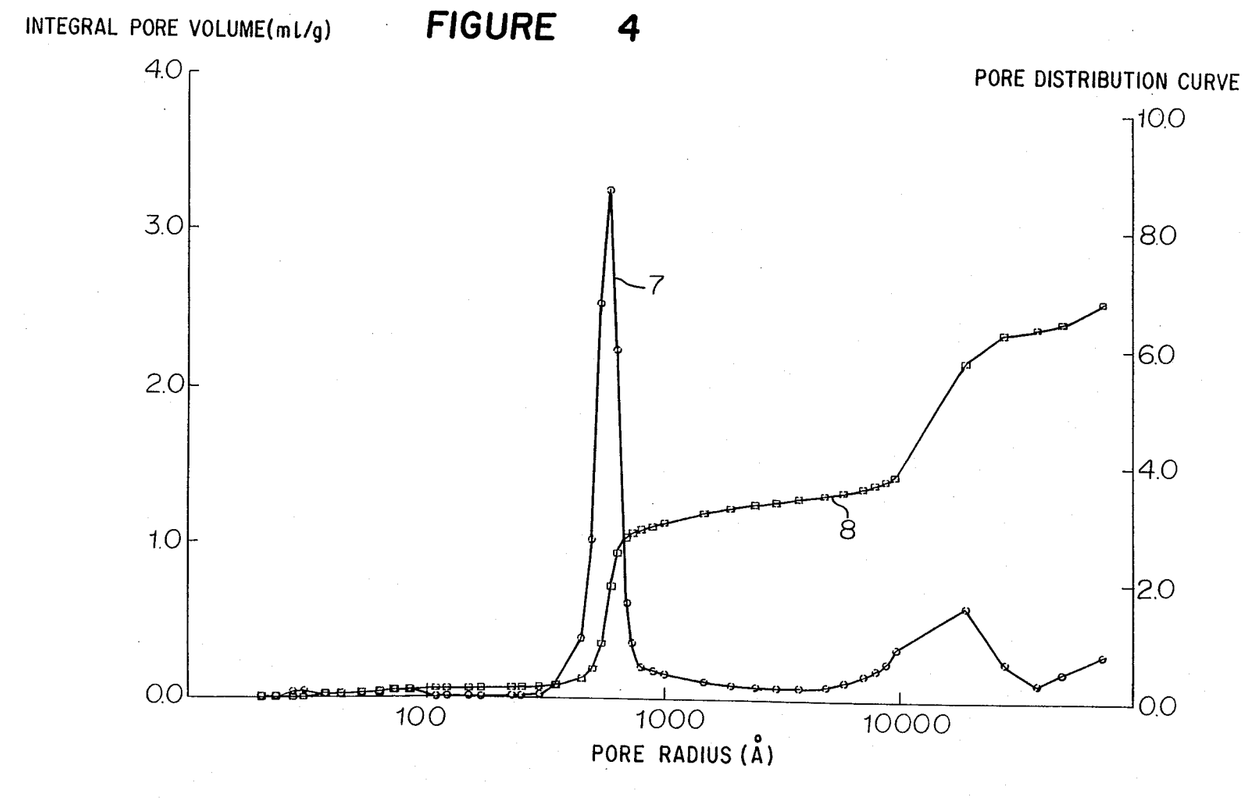
Figure 8:
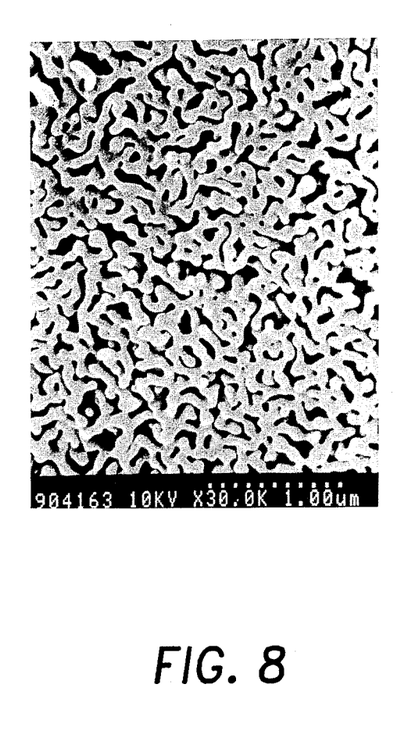

Porous glass was prepared (yield 0.69 g) in the same manner as in Example 10 except that the mixture comprising the dried gel, sodium chloride and zirconium oxychloride was calcined at 760° C. for 5 hours. The product had a surface area of 23 m²/g, a pore volume of pores having pore radii of from 20 to 10,000 Å of 1.13 ml/g and a pore volume of pores having pore radii of from 100 to 1,000 Å of 1.01 ml/g. The pore distribution curve is shown in FIG. 4, and the electron microscopic photograph is shown in FIG. 8.

This product had a composition comprising 82.5% by weight of SiO₂, 12.2% by weight of ZrO₂ and 4.4% by weight of Na₂O. The powder X-ray pattern of this sample was measured, whereby no peak due to crystals other than a broad pattern of non-crystalline structure was observed. The pore distribution state was found to be B/A=96.3% and C/A=89.4%.

EXAMPLE 12

Alkaline resistance was compared (Table 3) by quantitatively measuring the amount of eluted silica of each sample of Examples 10, 11 and Comparative Example which is composed solely of silica obtained by calcining the starting material gel at 760° C. for 5 hours. Namely, about 100 mg of each sample was weighed accurately, then immersed in a 0.1N sodium hydroxide aqueous solution and left to stand at room temperature for 24 hours. The supernatant was sampled, and eluted silica was quantitatively analyzed.

Besides, starting material silica (Comparative Example) was obtained by heating the dried gel of Comparative Example at 760° C. for 5 hours. It is evident from Table 3 that with samples according to the present invention, the SiO₂ elution is very little, and thus the alkaline resistance is excellent.

TABLE 3

| Sample | Heat treatment | SiO₂ elution (%) |
|---|---|---|
| Example 10 | ZrOCl₂-NaCl/730° C. | 2.3 |
| Example 11 | ZrOCl₂-NaCl/760° C. | 1.4 |
| Comparative Example (Starting material silica) | 760° C. | 92.7 |

The porous glass of the present invention contains a larger amount of zirconia than the conventional porous glass and thus has excellent alkaline resistance. Further, it has large pores having a pore diameter of at least 100 Å. The porous glass of the present invention can be produced to have a pore volume of about 3.0 ml/g or more, as compared with the pore volume of about 1.0 ml/g or less of the conventional porous glass. According to the present invention, the porous glass can be produced extremly easily as compared with the conventional phase separation method By properly selecting the type and the concentration of the salt or the heat treating temperature or time, it is possible to control the pore size as in the case of the phase separation method.

The porous glass of the present invention is useful not only for the applications of conventional porous glass, but also for a wider range of applications, since it is useful particularly in an alkaline region having a pH of higher than 7. For example, it is useful as a carrier having an adsorption separation function of a biological substance, or for various applications as membranes.

What is claimed is:

1. Porous glass consisting essentially of silica, zirconia and an alkali metal compound, wherein the content of zirconia is at least 5% by weight and the content of the alkali metal compound is at least 2% by weight as calculated as $M_2O$ wherein M is an alkali metal element, and the total pore volume (A) of pores having pore radii of from 20 to 10,000 Å is at least 0.2 ml/g, and the proportion of the pore volume (B) of pores having pore radii of from 100 to 10,000 Å to the said total pore volume (A) is at least 80%.

2. The porous glass according to claim 1, wherein the content of zirconia is from 5 to 50% by weight and the content of the alkali metal compound is from 2 to 20% by weight as calculated as $M_2O$ wherein M is an alkali metal element.

3. The porous glass according to claim 1, wherein the content of zirconia is from 10 to 30% by weight and the content of the alkali metal compound is from 2 to 15% by weight as calculated as $M_2O$ wherein M is an alkali metal element.

4. The porous glass according to claim 1, wherein the proportion of the pore volume (C) of pores having a pore radii of from 100 to 5,000 Å to the total pore volume (A) of pores having a pore radii of from 20 to 10,000 Å is at least 60%.

5. The porous glass according to claim 1, wherein the glass further comprises up to 10% by weight of at least one metal oxide selected from the group consisting of titania, alumina, boron oxide and rare earth oxides.

* * * * *